US009858409B2

United States Patent
Boss et al.

(10) Patent No.: US 9,858,409 B2
(45) Date of Patent: Jan. 2, 2018

(54) ENHANCING SECURITY OF A MOBILE DEVICE USING PRE-AUTHENTICATION SEQUENCES

(71) Applicant: International Business Machines Corporation, Armonk, NY (US)

(72) Inventors: Gregory J. Boss, Saginaw, MI (US); Andrea del Pilar Macias Garcia, Guachipelin de Escazu (CR); Diego Xirinachs Jimenez, Heredia (CR); Stephen J. McConnell, Belfast (GB); Piotr Pierga, Palatine, IL (US); Stacey Ramos, Cedar Hill, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 14/949,515

(22) Filed: Nov. 23, 2015

(65) Prior Publication Data

US 2017/0147809 A1    May 25, 2017

(51) Int. Cl.
*G06F 21/44*    (2013.01)
*G06F 21/45*    (2013.01)
*G06F 21/31*    (2013.01)
*H04L 29/12*    (2006.01)

(52) U.S. Cl.
CPC ........... *G06F 21/45* (2013.01); *G06F 21/316* (2013.01)

(58) Field of Classification Search
None
See application file for complete search history.

(56) References Cited

U.S. PATENT DOCUMENTS

| 8,645,707 | B2 | 2/2014 | Kim | |
|---|---|---|---|---|
| 2009/0199264 | A1* | 8/2009 | Lang | G06F 21/31 726/1 |
| 2011/0260829 | A1* | 10/2011 | Lee | G06F 3/0414 340/5.51 |

(Continued)

FOREIGN PATENT DOCUMENTS

KR    WO 2008136551 A1 *    11/2008    ........... G06F 1/3215

OTHER PUBLICATIONS

Google, "Set up 2-Step Verification", printed Sep. 6, 2015.

*Primary Examiner* — Venkat Perungavoor
(74) *Attorney, Agent, or Firm* — Martin & Associates, LLC; Derek P. Martin

(57) ABSTRACT

A mobile device includes a pre-authentication mechanism that allows a user to define a pre-authentication sequence that includes actions such as movement of the device, taps on the screen, key presses, etc., or any suitable combination of these. Correctly entering the pre-authentication sequence gives the user access to the main authentication screen for the device, while a failure to enter the pre-authentication sequence correctly keeps the device locked. Multiple pre-authentication sequences can be defined, each having a corresponding sleep time threshold. This requires the user to enter the appropriate authentication information corresponding to the time the device has been asleep. Multiple pre-authentication sequences can also be defined, each having corresponding authentication information. Thus, the authentication information the user needs to enter can be a function of the corresponding pre-authentication sequence.

18 Claims, 9 Drawing Sheets

(56) References Cited

U.S. PATENT DOCUMENTS

| | | | |
|---|---|---|---|
| 2012/0124662 A1 | 5/2012 | Baca et al. | |
| 2012/0173425 A1 | 7/2012 | Jeong | |
| 2012/0194440 A1* | 8/2012 | Ramrattan | G06F 3/04883 345/173 |
| 2012/0280917 A1* | 11/2012 | Toksvig | G06F 1/1626 345/173 |
| 2013/0061304 A1 | 3/2013 | Bruso et al. | |
| 2013/0104187 A1* | 4/2013 | Weidner | G06F 21/31 726/1 |
| 2013/0167221 A1* | 6/2013 | Vukoszavlyev | G06F 1/1694 726/16 |
| 2014/0019743 A1* | 1/2014 | DeLuca | G06F 1/3206 713/100 |
| 2014/0068755 A1* | 3/2014 | King | G06F 21/53 726/19 |
| 2014/0096178 A1 | 4/2014 | Shippy et al. | |
| 2014/0298430 A1* | 10/2014 | Tomasik | G06F 21/36 726/5 |
| 2015/0135298 A1* | 5/2015 | Robison | G06F 21/31 726/10 |
| 2015/0186628 A1* | 7/2015 | Bush | G06F 21/31 726/19 |
| 2015/0186661 A1* | 7/2015 | Hirase | G06F 21/6218 726/28 |
| 2015/0205946 A1* | 7/2015 | Aurongzeb | G06F 21/36 726/19 |
| 2015/0271647 A1* | 9/2015 | Megarity | H04M 19/047 455/456.1 |
| 2015/0356289 A1* | 12/2015 | Brown | G06F 21/44 726/7 |

\* cited by examiner

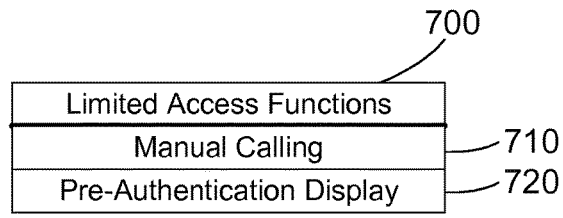
FIG. 7
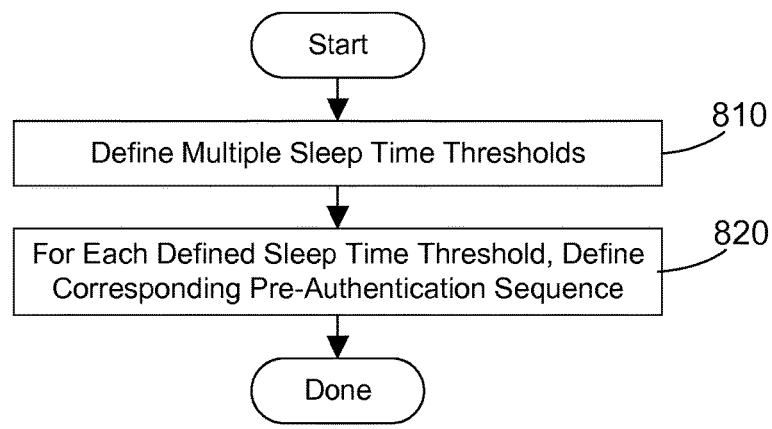
FIG. 8
FIG. 9

ENHANCING SECURITY OF A MOBILE DEVICE USING PRE-AUTHENTICATION SEQUENCES

BACKGROUND

1. Technical Field

This disclosure generally relates to mobile devices, and more specifically relates to enhancing security of a mobile device using pre-authentication sequences.

2. Background Art

Mobile devices such as smart phones and tablet computers typically include authentication mechanisms that require a user to enter a password or other authentication information before granting access to the device. One problem with known authentication mechanisms is the user is typically prompted on the display, and then enters the authentication information. When a user enters this authentication information in a busy public place such as a bus, an airport, a restaurant, etc., someone close to the user could see the authentication information. Thus, a person who intends to steal a mobile device might be looking over a user's shoulder when the user enters the authentication information. This would allow the person who steals the mobile device to unlock and use the mobile device after stealing it by simply entering the authentication information the original user entered.

SUMMARY

A mobile device includes a pre-authentication mechanism that allows a user to define a pre-authentication sequence that includes actions such as movement of the device, taps on the screen, key presses, etc., or any suitable combination of these. Correctly entering the pre-authentication sequence gives the user access to the main authentication screen for the device, while a failure to enter the pre-authentication sequence correctly keeps the device locked. Multiple pre-authentication sequences can be defined, each having a corresponding sleep time threshold. This requires the user to enter the appropriate authentication information corresponding to the time the device has been asleep. Multiple pre-authentication sequences can also be defined, each having corresponding authentication information. Thus, the authentication information the user needs to enter can be a function of the corresponding pre-authentication sequence.

The foregoing and other features and advantages will be apparent from the following more particular description, as illustrated in the accompanying drawings.

BRIEF DESCRIPTION OF THE DRAWING(S)

The disclosure will be described in conjunction with the appended drawings, where like designations denote like elements, and:

FIG. 7 is a table showing examples of limited access functions that are provided in step 640 in FIG. 6;

FIG. 8 is a flow diagram of a method for defining multiple pre-authentication sequences that correspond to multiple sleep time thresholds;

FIG. 9 is a block diagram showing one suitable implementation for the time-sensitive security mechanism in FIG. 2;

DETAILED DESCRIPTION

The disclosure and claims herein relate to a mobile device that includes a pre-authentication mechanism that allows a user to define a pre-authentication sequence that includes actions such as movement of the device, taps on the screen, key presses, etc., or any suitable combination of these. Correctly entering the pre-authentication sequence gives the user access to the main authentication screen for the device, while a failure to enter the pre-authentication sequence correctly keeps the device locked. Multiple pre-authentication sequences can be defined, each having a corresponding sleep time threshold. This requires the user to enter the appropriate authentication information corresponding to the time the device has been asleep. Multiple pre-authentication sequences can also be defined, each having corresponding authentication information. Thus, the authentication information the user needs to enter can be a function of the corresponding pre-authentication sequence.

Figure 1:
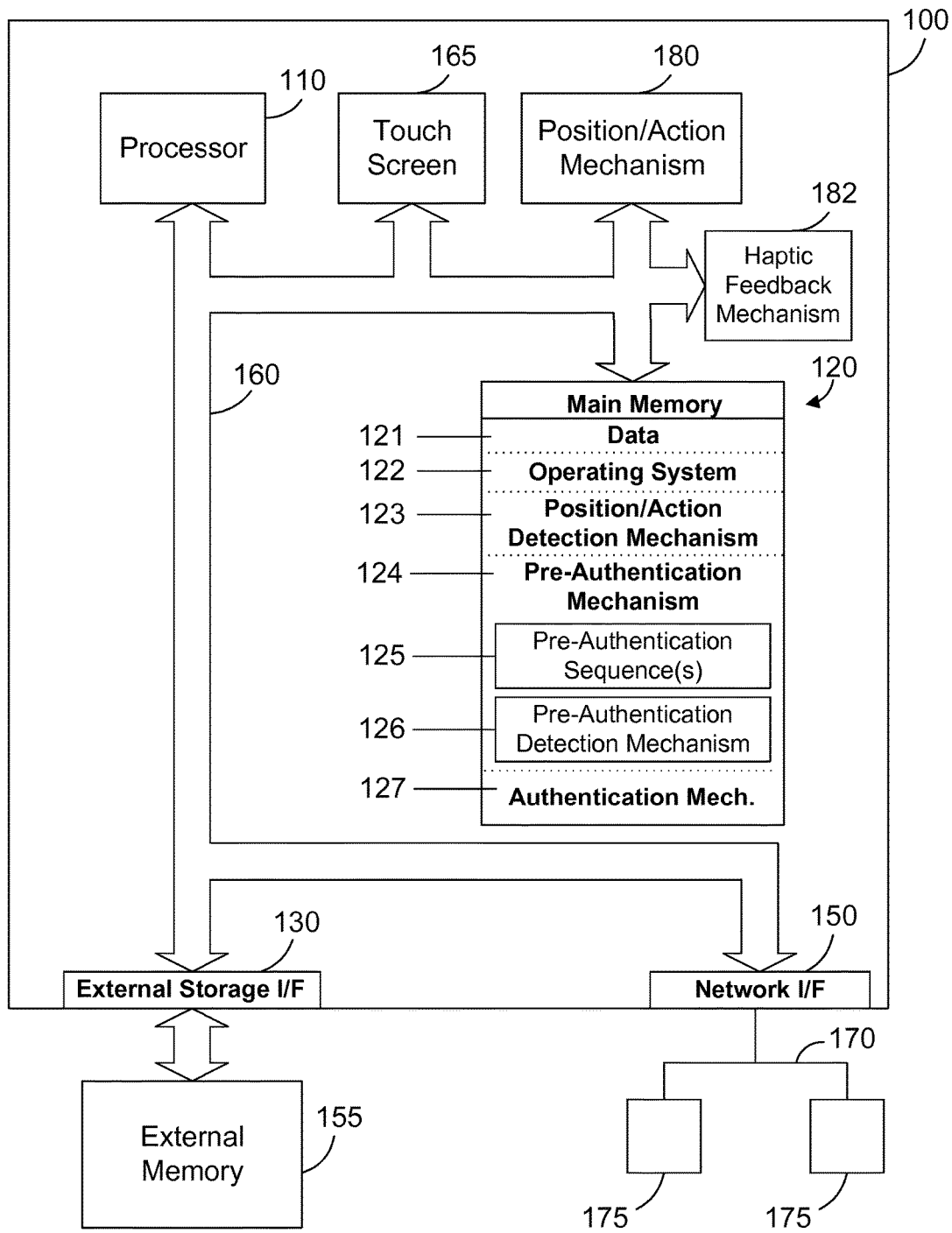
FIG. 1 is a block diagram of a mobile device.

Referring to FIG. 1, a mobile device 100 represents any suitable type of mobile device, including without limitation a smart phone, tablet computer, electronic book reader, notebook computer, laptop computer, gaming console, smart watch, etc. Those skilled in the art will appreciate that the disclosure herein applies equally to any type of mobile device. As shown in FIG. 1, mobile device 100 comprises one or more processors 110, a main memory 120, an external storage interface 130, a network interface 150, a touch screen 165, a position/action mechanism 180, and a haptic feedback mechanism 182. These system components are interconnected through the use of a system bus 160. External storage interface 130 is used to access external memory. One specific type of external memory 155 is non-volatile memory on an external device, such as an SD card, a micro-SD card, or a thumb drive.

Main memory 120 preferably contains data 121, an operating system 122, a position/action detection mechanism 123, a pre-authentication mechanism 124, and an authentication mechanism 127. Data 121 represents any data that serves as input to or output from any program in mobile device 100. Operating system 122 could be any suitable operating system for a mobile device. Known operating systems for mobile devices include the iOS operating system developed by Apple Computer, the Android operating system developed by Google, and the Windows Phone operating system developed by Microsoft.

The position/action mechanism 180 includes one or more suitable sensors, such as accelerometers and switches, that allow sensing orientation, movement, screen taps, and button presses of the mobile device 100. The position/action mechanism 180 can detect any suitable movement of the mobile device, including rotation of the mobile device (e.g., from portrait orientation to landscape orientation), linear movement of the mobile device in any direction, and shaking the mobile device. Of course, the position/action mechanism 180 could detect other types of movements as well, such as moving the mobile device in an arc or circular pattern. The position/action mechanism 180 expressly includes the capability of detecting any type of movement of the mobile device.

The position/action detection mechanism 123 receives input from the position/action mechanism 180 to determine orientation, movement, screen taps, and button presses for the mobile device 100. The position/action detection mechanism 123 is preferably used by the pre-authentication mechanism 124 to detect a sequence of events when a user defines a pre-authentication sequence, such as 125 shown in FIG. 1. Once the user defines a pre-authentication sequence 125, the pre-authentication detection mechanism 126 monitors actions of the user, and when the user actions match a pre-authentication sequence, a suitable authentication is then provided by the user to the authentication mechanism 127 to access the full functions of the mobile device 100.

The authentication mechanism 127 can include any suitable way for a user to authenticate to the mobile device, whether currently known or developed in the future. There are many different known ways for a user to authenticate to a mobile device, including entering a password, scanning a fingerprint, entering a geometrical pattern on the screen, voice recognition, retinal scan, etc.

The haptic feedback mechanism 182 provides feedback the user can feel while holding the mobile devices. Haptic feedback mechanisms are well-known in the art of mobile devices. One suitable implementation for haptic feedback mechanism 182 is a small motor that vibrates to notify the user of certain events, such as button presses, selections on the touch display, alarm events, etc. The haptic feedback mechanism 182 broadly encompasses any way to notify the user by feel, whether currently known or developed in the future.

The position/action detection mechanism 123 is shown in FIG. 1 to be separate from the pre-authentication mechanism 124. However, other implementations are possible. In one suitable implementation, the position/action detection mechanism 123 is implemented as part of the operating system 122. In an alternative implementation, the position/action detection mechanism 123 is implemented as part of the pre-authentication mechanism 124. The disclosure and claims herein expressly extend to any suitable way to detect positions and actions that can be part of a pre-authentication sequence, regardless of how or where those functions are performed.

Main memory 120 may include any suitable combination of different memory types. For example, main memory 120 could include dynamic random access memory (DRAM) that has a relatively small size and a fast access time and could also include non-volatile memory (NVRAM) that has a much larger size and a slower access time. Programs stored in NVRAM could then be loaded into the DRAM in order to be executed by the processor 110. This simple example shows the main memory 120 can include any suitable number and type of memories in any suitable hierarchy, whether currently known or developed in the future.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the position/action detection mechanism 123 and pre-authentication mechanism 124 under the control of the operating system 122.

Although mobile device 100 is shown to contain only a single processor and a single system bus, those skilled in the art will appreciate that the pre-authentication mechanism may be practiced using a mobile device that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Touch screen 165 is a display that allows the user to select functions on the mobile device 100 by touching the touch screen 165 and/or by making one or more gestures on the touch screen 165, including a finger swipe and a finger tap.

Network interface 150 is used to connect mobile device 100 to a network 170. Network interface 150 broadly represents any suitable way to interconnect electronic devices, such as mobile device 100, to other devices 175, regardless of whether the network 170 comprises present-day analog and/or digital techniques or via some networking mechanism of the future. Network interface 150 preferably includes a combination of hardware and software that allow communicating on the network 170. The network interface 150 can include multiple different network interfaces. For example, network interface 150 could include a wireless interface for communicating with a 4G network, a WiFi interface for communicating with a WiFi network, and a Bluetooth interface for communicating with other devices via Bluetooth. Software in the network interface 150 preferably includes a communication manager that manages communication with other devices 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

Figure 2:
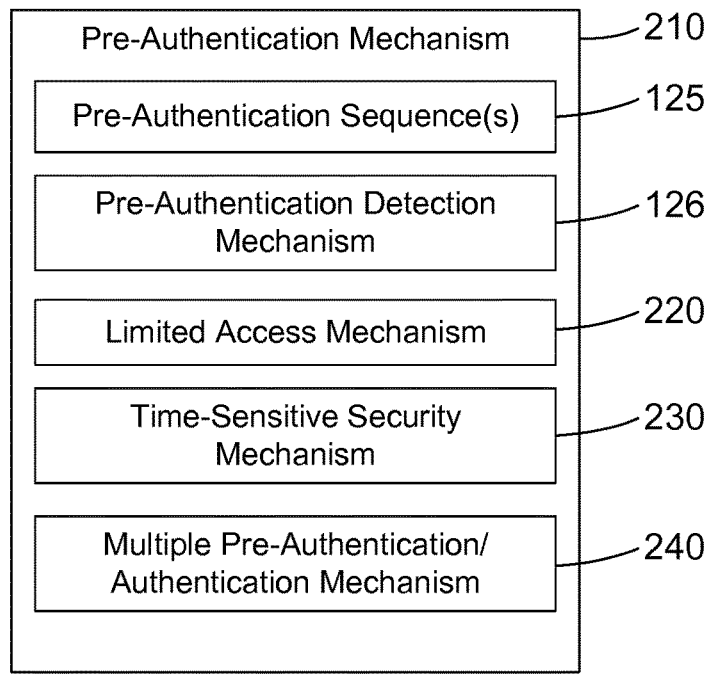
FIG. 2 is a block diagram showing one suitable implementation for the pre-authentication mechanism shown in FIG. 1.

One suitable implementation for the pre-authentication mechanism 124 in FIG. 1 is shown as pre-authentication mechanism 210 in FIG. 2. The pre-authentication mechanism 210 includes one or more pre-authentication sequences 125 and a pre-authentication detection mechanism 126, as also shown in FIG. 1. Pre-authentication mechanism 210 additionally includes a limited access mechanism 220, a time-sensitive security mechanism 230, and a multiple pre-authentication/authentication mechanism 240. The pre-authentication mechanism 210 could include any or all of mechanisms 220, 230 and 240.

Figure 3:
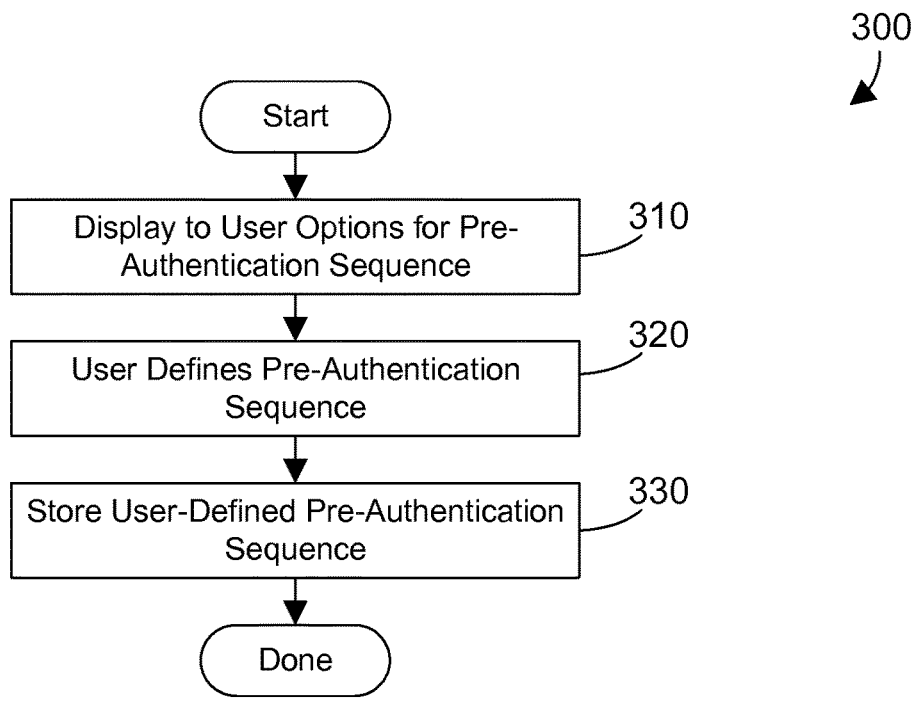
FIG. 3 is a flow diagram of a method for a user to define and store a pre-authentication sequence.

Referring to FIG. 3, a method 300 is preferably performed by the pre-authentication mechanism, such as 124 in FIG. 1 and/or 210 in FIG. 2. Options for defining a pre-authentication sequence are displayed to the user (step 310). The user then defines a pre-authentication sequence (step 320). The user-defined pre-authentication sequence is then stored (step 330), as shown at 125 in FIG. 1.

Figure 4:
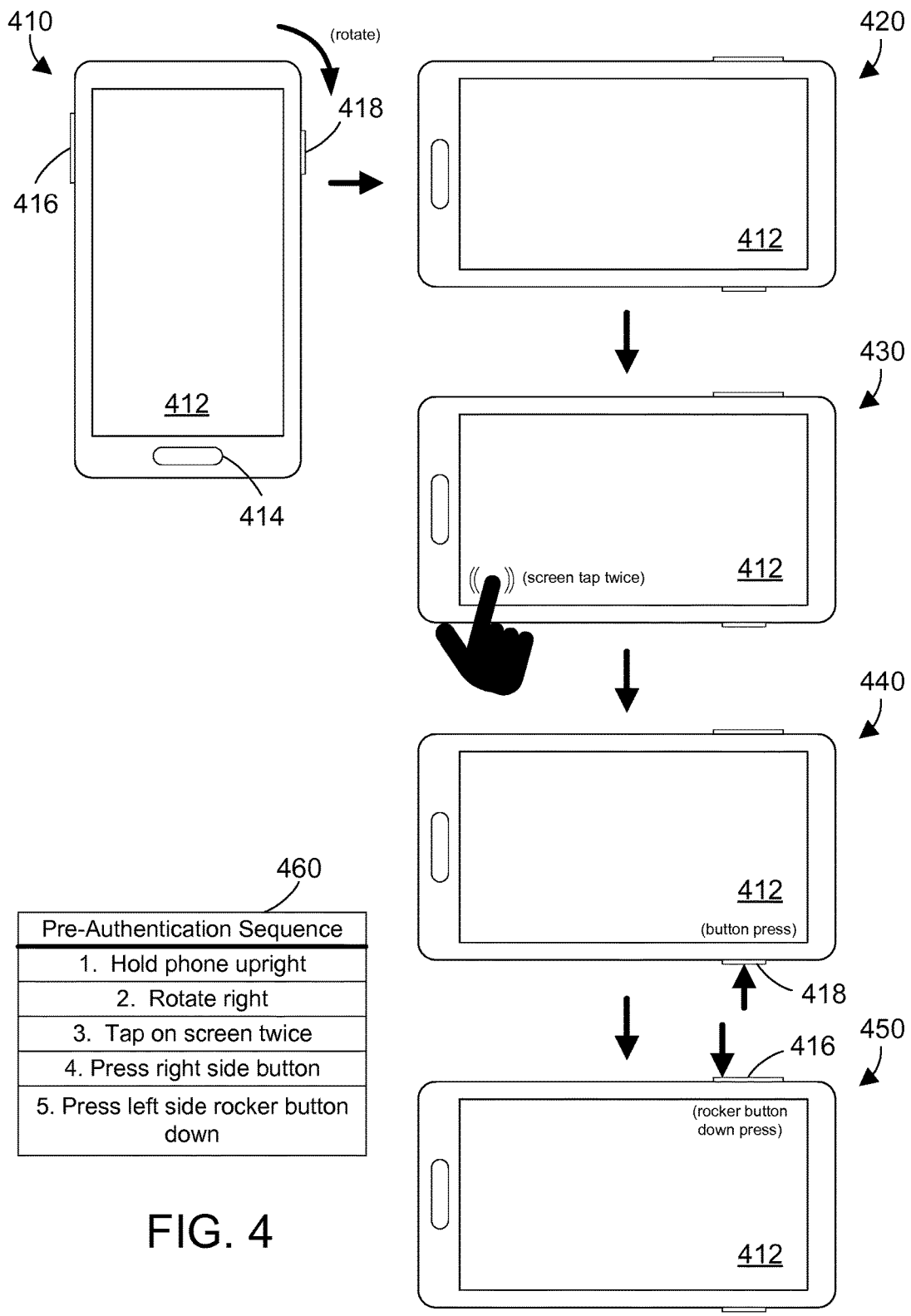
FIG. 4 is a block diagram showing a sequence of actions on a mobile device that defines a pre-authentication sequence.

FIG. 4 shows a graphical example of how a user could define a pre-authentication sequence. This example assume the mobile device is a mobile phone with a touch screen 412, a home button 414, a rocker button 416 that can be pressed either up or down, and a push button 418. We assume the user puts the mobile phone in a mode to define a pre-authentication sequence. The user then holds the phone upright in portrait orientation, as shown at 410. The user then rotates the phone right to landscape orientation, as shown at 420. The user then taps the screen anywhere twice, as shown at 430. The user then presses button 418, as shown at 440. The user then presses the rocker button 416 down, as shown at 450. The user then terminates the definition of the pre-authentication sequence. The resulting pre-authentication sequence is shown at 460 in FIG. 4, with each of the actions in the sequence in the order it was performed.

The user could include any suitable user action, such as movement, screen taps or button presses, in a pre-authentication sequence. For example, a user might prefer a user action that is not easily observable by another, such as pressing a button while lifting the mobile device from a pocket or purse. The user could shake the device, move the device in a circle, or perform any other suitable movement. The pre-authentication sequences disclosed herein may include any suitable combination of user actions on the mobile device, including movements and/or screen taps and/or button presses.

Figure 5:
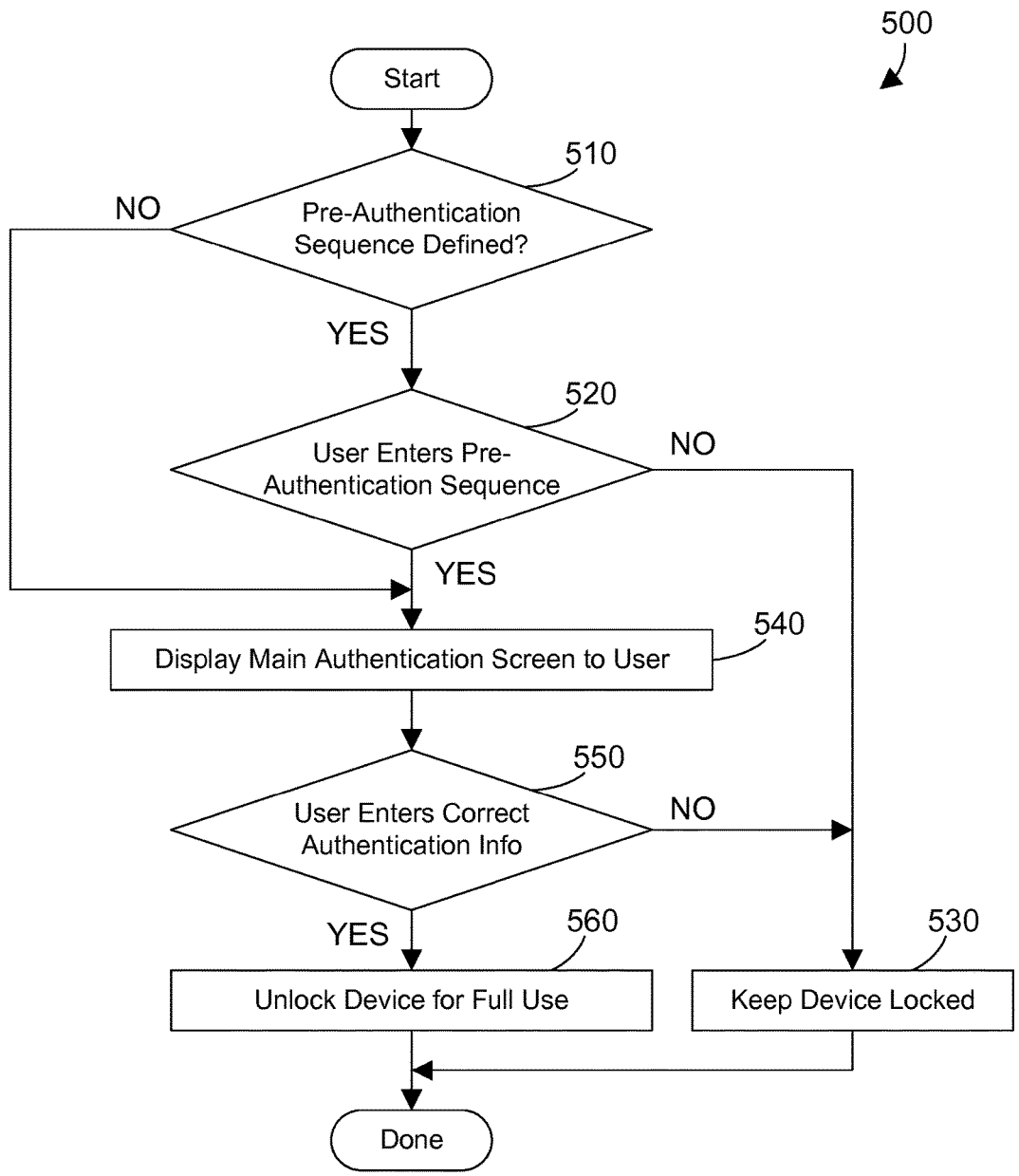
FIG. 5 is flow diagram of a first method performed by the pre-authentication mechanism in FIG. 1.

The pre-authentication mechanism 124 in FIG. 1 preferably performs the method 500 shown in FIG. 5. When a pre-authentication sequence has been defined (step 510=YES), if the user enters the pre-authentication sequence (step 520=YES), a main authentication screen is displayed to the user (step 540). When the user enters the correct authentication information (step 550=YES), the device is unlocked for full use (step 560). When the user does not enter the expected pre-authentication sequence (step 520=NO), the device is kept locked (step 530), which means the user does not have access to any of the functions on the mobile device. When the user does not enter the correct authentication information (step 550=NO), the device is also kept locked (step 530). When there is no pre-authentication sequence defined (step 510=NO), the main authentication screen is displayed to the user (step 540), and method 500 continues as previously described. Method 500 provides a two-stage process for unlocking a mobile device, the first stage requiring entry of the expected pre-authentication sequence, and the second state requiring the user to authenticate to the mobile device. As mentioned above, the user can authenticate to the mobile device in any suitable way, whether currently known or developed in the future.

Figure 6:
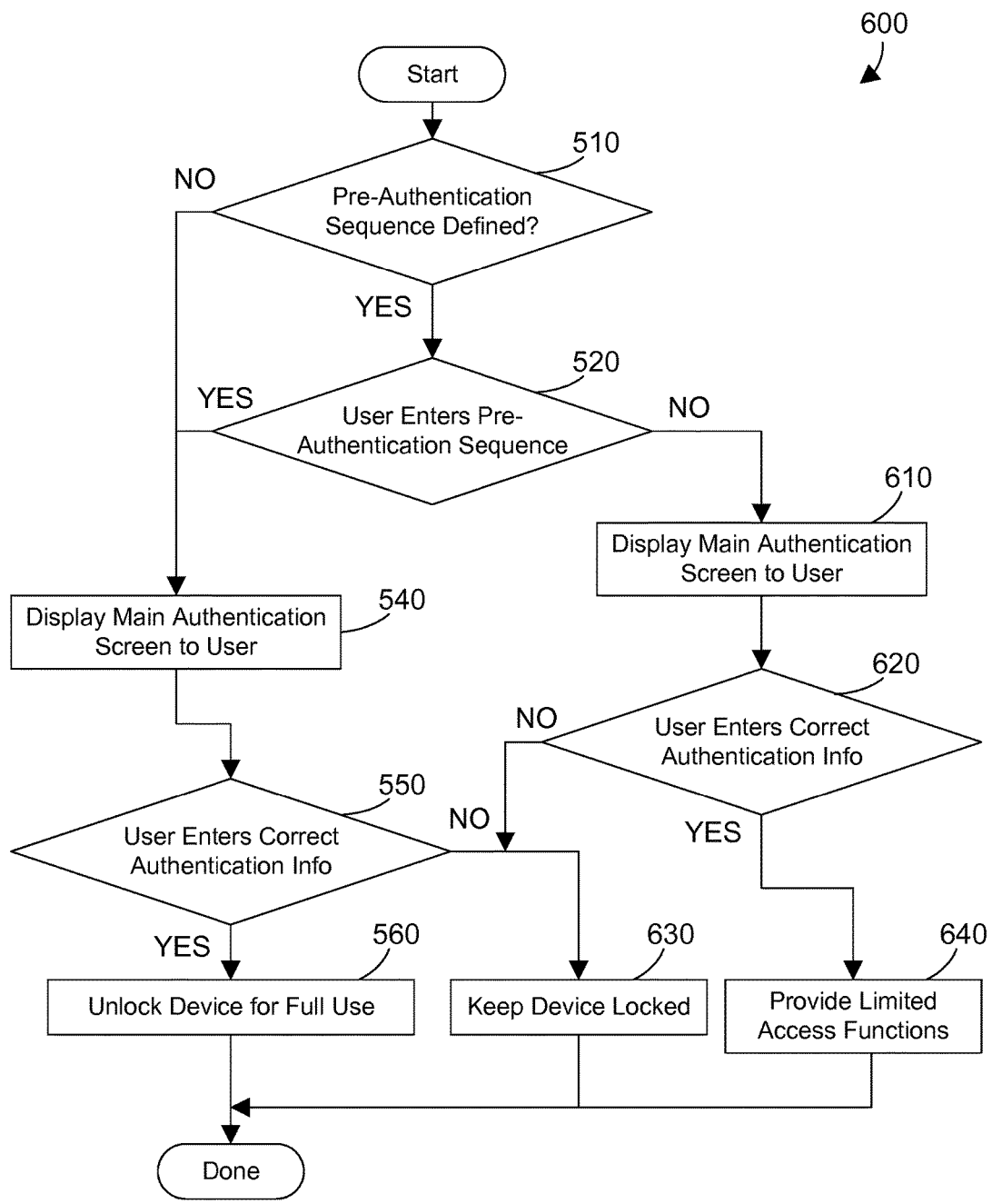
FIG. 6 is a flow diagram of a second method performed by the pre-authentication mechanism in FIG. 1.

FIG. 6 shows a method 600 that is similar to method 500 in FIG. 5, in some respects. When a pre-authentication sequence has been defined (step 510=YES), if the user enters the pre-authentication sequence (step 520=YES), a main authentication screen is displayed to the user (step 540). When the user enters the correct authentication information (step 550=YES), the device is unlocked for full use (step 560). These steps in FIG. 6 to this point are the same as the corresponding steps in FIG. 5. When the user does not enter the expected pre-authentication sequence (step 520=NO), the main authentication screen is displayed to the user (step 610). When the user does not enter correct authentication information (step 620=NO), the device is kept locked (step 630). When the user enters correct authentication info (step 620=YES), limited access functions are provided (step 640). Referring to FIG. 7, examples of limited access functions 700 could include manual calling 710 and a pre-authentication display 720 that prompts the user to perform the expected pre-authentication sequence. The limited access mechanism 220 in FIG. 2 preferably provides the limited access functions on the mobile device in step 640 in FIG. 6. Note the limited access functions can include any suitable subset of functions on the mobile device.

Figure 10:
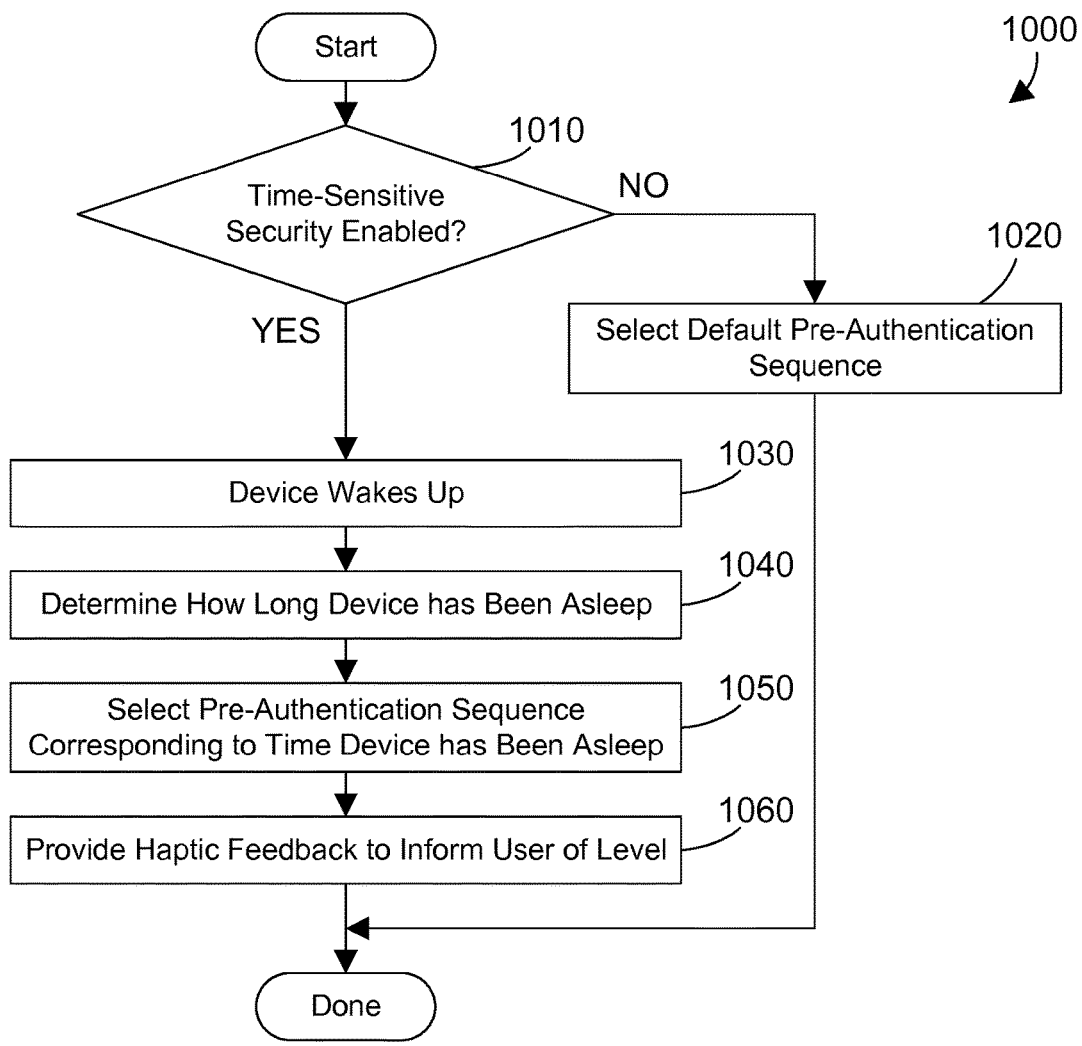
FIG. 10 is a flow diagram of a method for the pre-authentication mechanism to function according to the levels and corresponding sleep time thresholds and pre-authentication sequences such as those in FIG. 9.

The pre-authentication mechanism disclosed herein supports defining multiple pre-authentication sequences. A first embodiment that includes multiple pre-authentication sequences is shown in FIGS. 8-10. Referring to FIG. 8, a method 800 defines multiple sleep time thresholds (step 810), and for each sleep time threshold, the user defines a corresponding pre-authentication sequence (step 820). The order of these steps could be reversed, with the user first defining a pre-authentication sequence and then defining a corresponding sleep time threshold. The number of sleep time thresholds can correspond to a security level, as shown in FIG. 9. The time-sensitive security mechanism 910 shown in FIG. 9 is one suitable implementation for the time-sensitive security mechanism 230 shown in FIG. 2. The time-sensitive security mechanism 910 includes a sleep time/pre-authentication sequence table 920 that includes a plurality of entries, where each entry specifies a security level, a corresponding sleep time threshold, and a corresponding pre-authentication sequence. Thus, entry 930 shows a security level of 1 with a corresponding sleep time threshold of 30 seconds and a corresponding pre-authentication sequence of Sequence 1. Entry 940 shows a security level of 2 with a corresponding sleep time threshold of 5 minutes and a corresponding pre-authentication sequence of Sequence 2. Entry 950 shows a security level of 3 with a corresponding sleep time threshold of 20 minutes and a corresponding pre-authentication sequence of Sequence 3. Entry 960 shows a security level of 4 with a corresponding sleep time threshold of 1 hour and a corresponding pre-authentication sequence of Sequence 4. Entry 970 shows a security level of 5 with a corresponding sleep time threshold of greater than 1 hour and a corresponding pre-authentication sequence of Sequence 5. The pre-authentication sequences could all be different, or some of them could be the same, according to the user's preferences.

One suitable example of the function of the time-sensitive security mechanism 910 is shown as method 1000 in FIG. 10. When time-sensitive security is not enabled (step 1010=NO), the default pre-authentication sequence is selected (step 1020). When time-sensitive security is enabled (step 1010=YES), when the device wakes up (step 1030), the device determines how long it was asleep (step 1040). The pre-authentication sequence corresponding to the time the device has been asleep is selected (step 1050). Haptic feedback is provided to inform the user of the security level (step 1060). Method 1000 is then done. A simple example will illustrate. Let's assume time-sensitive security is enabled (step 1010=YES), and when the device wakes up (step 1030), it determines in has been asleep for 7 minutes 23 seconds. Referring to FIG. 9, the sleep time thresholds for security levels 1-4 are maximum values. Thus, 7 minutes 23 seconds corresponds to security level 3, which applies whenever the device has been asleep for more than 5 minutes and less than 20 minutes. Thus, based on the time the device was asleep, the corresponding security level, namely 3, and the corresponding pre-authentication sequence, namely Sequence 3, can be selected in step 1050 in FIG. 10. The haptic feedback to the user in step 1060 is any suitable feedback that the user can feel on the mobile device. For the specific example in FIG. 9, the haptic feedback in step 1060 could be three short vibrations to indicate to the user security level 3, which tells the user he or she needs to input Sequence 3 to gain access to the authentication mechanism for the mobile device. Method 1000 determines which pre-authentication sequence is selected. Once selected, method 500 in FIG. 5 or method 600 in FIG. 6 could be performed, with the required pre-authentication sequence in step 520 being the pre-authentication sequence identified in method 1000 in FIG. 10.

Figure 11:
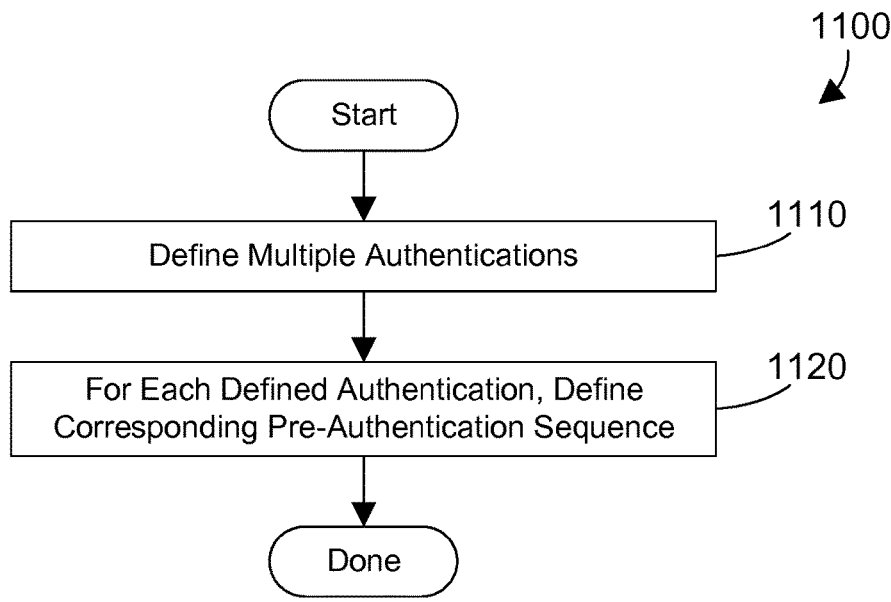
FIG. 11 is a flow diagram of a method for defining multiple pre-authentication sequences that correspond to multiple authentications.
Figure 12:
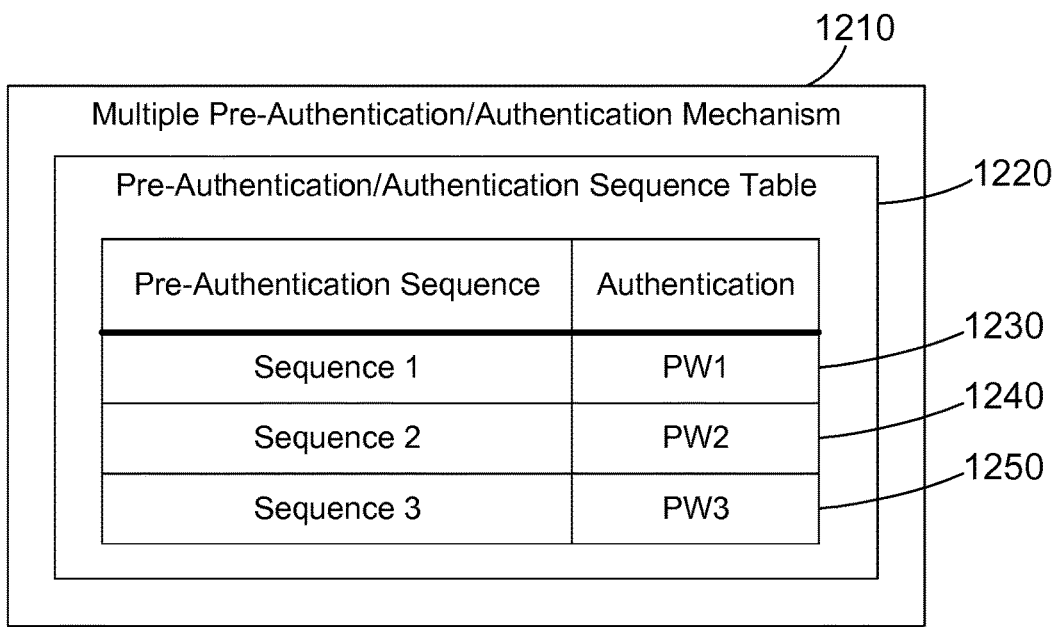
FIG. 12 is a block diagram showing one suitable implementation for the multiple pre-authentication/authentication mechanism in FIG. 2.
Figure 13:
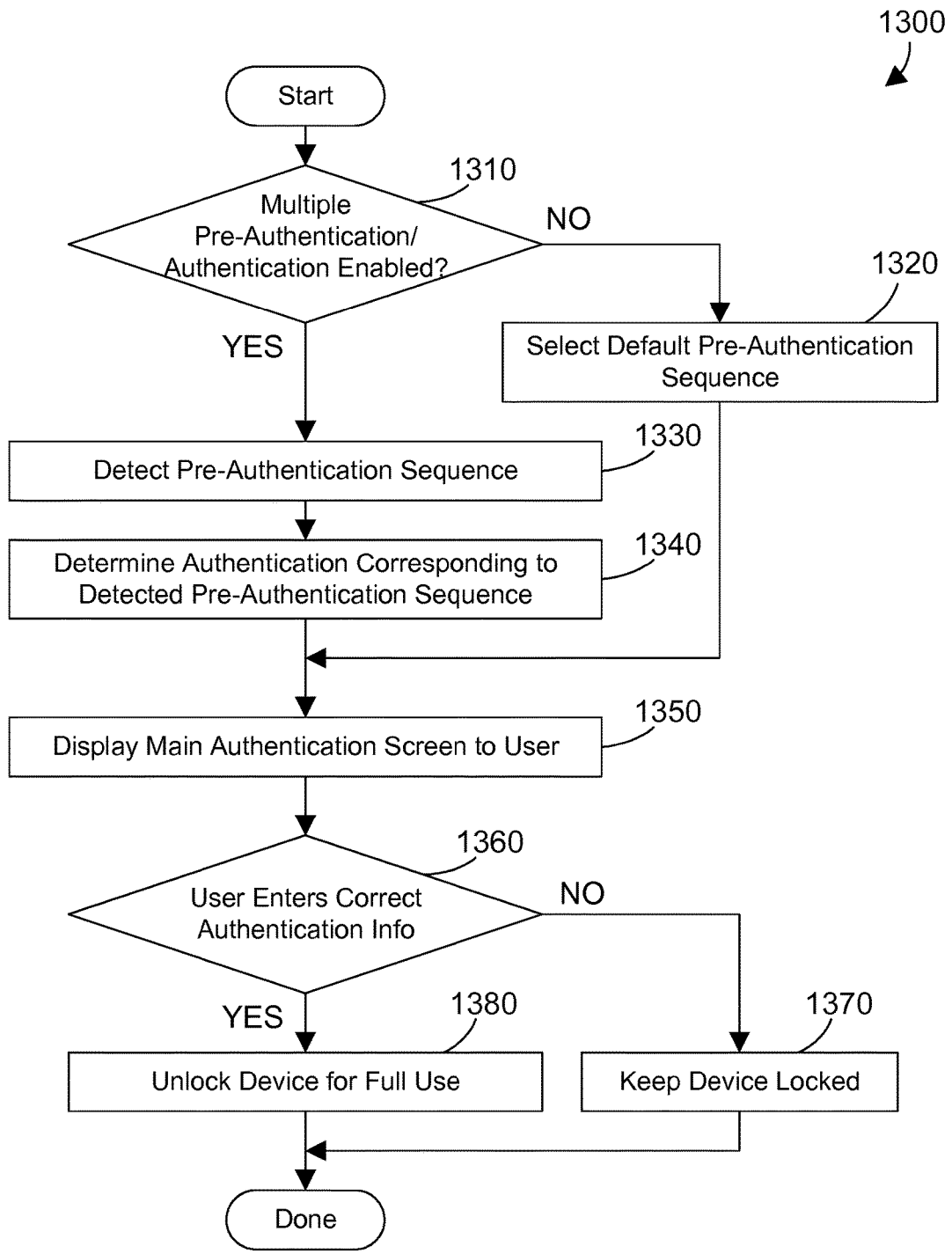
FIG. 13 is a flow diagram of a method for the pre-authentication mechanism to function according to the pre-authentication sequences and corresponding authentications such as those in FIG. 12.

A second embodiment that includes multiple pre-authentication sequences is shown in FIGS. 11-13. Referring to FIG. 11, method 1100 is preferably performed by the multiple pre-authentication/authentication mechanism 240 shown in FIG. 2. Multiple authentications are defined by the user (step 1110). For each defined authentication, a corresponding pre-authentication sequence is defined (step 1120). A simple example is shown in FIG. 12, where the multiple pre-authentication/authentication mechanism 1210 is one suitable implementation for the multiple pre-authentication/authentication mechanism 240 shown in FIG. 2. The multiple pre-authentication/authentication mechanism 1210 includes a pre-authentication/authentication sequence table 1220 with a plurality of entries, where each entry includes a pre-authentication sequence and corresponding authentication information. For this specific example, the authentication is done via the user entering a password, and each pre-authentication sequence has a corresponding password. Thus, entry 1230 has a pre-authentication sequence of Sequence 1 with a corresponding password of PW1. Entry 1240 has a pre-authentication sequence of Sequence 2 with a corresponding password of PW2. Entry 1250 has a pre-authentication sequence of Sequence 3 with a corresponding password of PW3. When the user enters a pre-authentication sequence, the multiple pre-authentication/authentication mechanism 1210 determines whether the pre-authentication sequence matches any of the pre-authentication sequences in the table 1220, and when it does, the authentication mechanism requires the corresponding password from the user.

Referring to FIG. 13, a method 1300 begins by determining whether multiple pre-authentication/authentication is enabled (step 1310). If not (step 1310=NO), the default pre-authentication sequence is selected (step 1320). If so (step 1310=YES), method 1300 waits for the user to input a valid pre-authentication sequence (step 1330). The authentication corresponding to the detected pre-authentication sequence is determined (step 1340). The main authorization screen is then displayed to the user (step 1350). When the user enters the correct authentication information (step 1360=YES), the device is unlocked for full use (step 1380). When the user does not enter the correct authentication information (step 1360=NO), the device is kept locked (step 1370). Method 1300 is then done. A simple example will illustrate. We assume the user has defined three different pre-authentication sequences, with three different corresponding passwords, as shown in FIG. 12. Assuming step 1310=YES in FIG. 13, we assume the user inputs Sequence 2, which is detected in step 1330. The corresponding authentication is PW2, as shown in entry 1240 in table 1220 in FIG. 12, which is determined in step 1340. The main authentication screen is then displayed to the user in step 1350. If the user enters PW2, step 1360=YES, and the device is unlocked for full use (step 1380). If the user enters PW1, even though this is a valid password, it is not the password corresponding to the pre-authentication sequence, so step 1360=NO, and the device is kept locked (step 1370). Of course, method 1300 in FIG. 13 could be modified to replace step 1370 with steps similar to those shown in FIG. 6 so limited access functions could be provided in some circumstances.

The pre-authentication mechanism disclosed herein could be provided as an app on a mobile device. This allows a user to custom-define a pre-authentication sequence that must be performed before the user is provided the main authentication screen. The pre-authentication could be very simple, such as one or two user actions, or could include a very long sequence of many user actions, depending on the preference of the user. The pre-authentication mechanism thus provides two-stage security on a mobile device that makes it more difficult for unauthorized users to access a mobile device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims herein relate to a mobile device that includes a pre-authentication mechanism that allows a user to define a pre-authentication sequence that includes actions such as movement of the device, taps on the screen, key presses, etc., or any suitable combination of these. Correctly entering the pre-authentication sequence gives the user access to the main authentication screen for the device, while a failure to enter the pre-authentication sequence correctly keeps the device locked. Multiple pre-authentication sequences can be defined, each having a corresponding sleep time threshold. This requires the user to enter the appropriate authentication information corresponding to the time the device has been asleep. Multiple pre-authentication sequences can also be defined, each having corresponding authentication information. Thus, the authentication information the user needs to enter can be a function of the corresponding pre-authentication sequence.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A mobile device comprising:
a processor;
a memory coupled to the processor;
a touch screen display coupled to the processor;
a haptic feedback mechanism coupled to the processor;
a position/action detection mechanism residing in the memory and executed by the processor that detects a plurality of user actions on the mobile device including movement of the mobile device and taps on the touch screen display; and
a pre-authentication mechanism residing in the memory and executed by the processor that allows a user to define a plurality of pre-authentication sequences, each pre-authentication sequence comprising at least one of the plurality of user actions, and to associate each of the plurality of pre-authentication sequences to a corresponding security level and time threshold, and detects a length of time the mobile device was asleep when the mobile device wakes up from a sleep mode, and in response, determines the security level corresponding to the length of time the mobile device was asleep, and provides haptic feedback to the user via the haptic feedback mechanism to indicate to the user the security level corresponding to the length of time the mobile device was asleep, wherein the pre-authentication mechanism provides limited access functions on the mobile device when the user does not enter the pre-authentication sequence corresponding to the length of time the mobile device was asleep and enters correct authentication information to the mobile device.

2. The mobile device of claim 1 wherein when the pre-authentication mechanism detects the user performs the pre-authentication sequence corresponding to the length of time the mobile device was asleep, the pre-authentication mechanism allows the user to authenticate to the mobile device, thereby allowing the user full access to the functions of the user device.

3. The mobile device of claim 2 wherein the user authenticates to the mobile device by entering a password on the mobile device.

4. The mobile device of claim 1 wherein when the user does not perform the pre-authentication sequence corresponding to the length of time the mobile device was asleep, the pre-authentication mechanism does not allow the user to authenticate to the mobile device.

5. The mobile device of claim 1 wherein the plurality of user actions further includes a press of at least one button the mobile device.

6. The mobile device of claim 1 wherein movement of the mobile device comprises rotation of the mobile device, linear movement of the mobile device, and shaking the mobile device.

7. A computer-implemented method for unlocking a mobile device, the method comprising:
   allowing a user to define a plurality of pre-authentication sequences, each pre-authentication sequence comprising at least one of a plurality of user actions on the mobile device including movement of the mobile device and taps on the touch screen display;
   allowing a user to associate each of the plurality of pre-authentication sequences to a corresponding security level and time threshold;
   detecting a length of time the mobile device was asleep when the mobile device wakes up from a sleep mode;
   determining the security level corresponding to the length of time the mobile device was asleep;
   providing haptic feedback to the user to indicate to the user the security level corresponding to the length of time the mobile device was asleep; and
   providing limited access functions on the mobile device when the user does not enter the pre-authentication sequence corresponding to the length of time the mobile device was asleep and enters correct authentication information to the mobile device.

8. The method of claim 7 further comprising:
   when the user performs the pre-authentication sequence corresponding to the length of time the mobile device was asleep, allowing the user to authenticate to the mobile device, thereby allowing the user full access to the functions of the user device.

9. The method of claim 8 wherein the user authenticates to the mobile device by entering a password on the mobile device.

10. The method of claim 7 further comprising:
    when the user does not perform the pre-authentication sequence corresponding to the length of time the mobile device was asleep, not allowing the user to authenticate to the mobile device.

11. The method of claim 7 wherein the plurality of user actions further includes a press of at least one button the mobile device.

12. The method of claim 7 wherein movement of the mobile device comprises rotation of the mobile device, linear movement of the mobile device, and shaking the mobile device.

13. An article of manufacture comprising software stored on a computer readable storage medium, the software comprising:
    a position/action detection mechanism that detects a plurality of user actions on a mobile device including movement of the mobile device and taps on a touch screen display on the mobile device; and
    a pre-authentication mechanism that allows a user to define a plurality of pre-authentication sequences, each pre-authentication sequence comprising at least one of the plurality of user actions, and to associate each of the plurality of pre-authentication sequences to a corresponding security level and time threshold, and detects a length of time the mobile device was asleep when the mobile device wakes up from a sleep mode, and in response, determines the security level corresponding to the length of time the mobile device was asleep, and provides haptic feedback to the user to indicate to the user the security level corresponding to the length of time the mobile device was asleep, wherein the pre-authentication mechanism provides limited access functions on the mobile device when the user does not enter the pre-authentication sequence corresponding to the length of time the mobile device was asleep and enters correct authentication information to the mobile device.

14. The article of manufacture of claim 13 wherein when the pre-authentication mechanism detects the user performs the pre-authentication sequence corresponding to the length of time the mobile device was asleep, the pre-authentication mechanism allows the user to authenticate to the mobile device, thereby allowing the user full access to the functions of the user device.

15. The article of manufacture of claim 14 wherein the user authenticates to the mobile device by entering a password on the mobile device.

16. The article of manufacture of claim 13 wherein when the user does not perform the pre-authentication sequence corresponding to the length of time the mobile device was asleep, the pre-authentication mechanism does not allow the user to authenticate to the mobile device.

17. The article of manufacture of claim 13 wherein the plurality of user actions further includes a press of at least one button the mobile device.

18. The article of manufacture of claim 13 wherein movement of the mobile device comprises rotation of the mobile device, linear movement of the mobile device, and shaking the mobile device.

* * * * *